(12) United States Patent
Kumar et al.

(10) Patent No.: US 12,309,008 B1
(45) Date of Patent: May 20, 2025

(54) PASSIVE EQUALIZATION CIRCUIT

(71) Applicant: Cadence Design Systems, Inc., San Jose, CA (US)

(72) Inventors: Vinod Kumar, Uttar Pradesh (IN); Hajee Mohammed Shuaeb Fazeel, Bengaluru (IN); Phalguni Bala, Karnataka (IN)

(73) Assignee: Cadence Design Systems Inc., San Jose, CA (US)

( * ) Notice: Subject to any disclaimer, the term of this patent is extended or adjusted under 35 U.S.C. 154(b) by 0 days.

(21) Appl. No.: 18/334,580

(22) Filed: Jun. 14, 2023

(51) Int. Cl.
*H04L 25/03* (2006.01)
*H04L 25/02* (2006.01)

(52) U.S. Cl.
CPC ...... *H04L 25/03878* (2013.01); *H04L 25/028* (2013.01); *H04L 25/0292* (2013.01)

(58) Field of Classification Search
CPC ............. H04L 25/03878; H04L 25/028; H04L 25/0292
USPC ......................................... 375/229, 230–233
See application file for complete search history.

(56) References Cited

U.S. PATENT DOCUMENTS

| | | | |
|---|---|---|---|
| 2004/0145380 A1* | 7/2004 | Babcock | G01R 31/31924 324/750.3 |
| 2006/0151851 A1* | 7/2006 | Pillai | H01L 23/5227 257/536 |
| 2012/0169433 A1* | 7/2012 | Mullins | H03H 7/0115 333/181 |
| 2019/0044564 A1* | 2/2019 | Zhang | G06F 13/4086 |
| 2019/0123551 A1* | 4/2019 | Yuan | H02H 9/046 |
| 2023/0017554 A1* | 1/2023 | Ikegami | H04L 5/14 |
| 2023/0198251 A1* | 6/2023 | Takeuchi | H02H 9/046 361/56 |
| 2024/0153542 A1* | 5/2024 | Brox | G11C 7/1057 |

* cited by examiner

*Primary Examiner* — Emmanuel Bayard
(74) *Attorney, Agent, or Firm* — Mark H. Whittenberger; Holland & Knight LLP (57) ABSTRACT

Embodiments included herein are directed towards a passive equalization circuit. The circuit may include a transmitter, a receiver; and a passive equalization circuit that may be located between the transmitter and the receiver. A first inductor may be located between the transmitter and a primary node net, and a second inductor may be located between the primary node net and a pad, and a third inductor may be located between the primary node net and the receiver.

18 Claims, 6 Drawing Sheets

PASSIVE EQUALIZATION CIRCUIT

FIELD OF THE INVENTION

The present disclosure relates to electronic circuit transmission architecture, and more particularly, to a passive equalization circuit that may be used with various modulation schemes.

BACKGROUND

Emerging technologies like three-dimensional (3D) gaming, artificial intelligence (AI), high-performance computing (HPC), graphics applications, and advanced driver assistance systems may require a very high bandwidth memory interface. As the speed of the interface increases, the unit interval (UI) available for data transfer decreases and hence the interface data path time constant starts limiting the speed of the interface.

In a memory interface, the output PAD time constant ($\tau$) is given as, $$\tau = R_{driver} * C_{pad}$$

Where $R_{driver}$ represents the output impedance of the driver and $C_{pad}$ represents the total capacitance seen by the output driver. Since most memory interfaces communicate via a channel the output driver impedance $R_{driver}$ of the memory interface may need to be matched with the channel characteristic impedance to avoid any signal integrity issues. The channel characteristic impedances are often in the range of 40-60$\Omega$ and hence the output driver impedance may not be reduced below 40$\Omega$. Therefore, to reduce the driver output time constant the value of capacitance seen by the output driver may need to be reduced.

SUMMARY

In one or more embodiments of the present disclosure, a passive equalization circuit is provided. The circuit may include a transmitter, a receiver; and a passive equalization circuit that may be located between the transmitter and the receiver. A first inductor may be located between the transmitter and a primary node net, and a second inductor may be located between the primary node net and a pad, and a third inductor may be located between the primary node net and the receiver.

One or more of the following features may be included. A first capacitor may be located between the transmitter and the first inductor. A second capacitor located between the second inductor and the pad. A third capacitor located between the third inductor and the receiver. A fourth capacitor located between the primary node net and a primary electrostatic discharge clamp. The transmitter and the receiver may be configured for three level pulse-amplitude modulation signaling. The primary node net may be operatively connected to the primary electrostatic discharge clamp.

In one or more embodiments of the present disclosure, a method is provided. The method may include generating a signal at a transmitter and receiving the signal from the transmitter at a passive equalization circuit located between the transmitter and a receiver. The passive equalization circuit may include a first inductor located between the transmitter and a primary node net, and a second inductor located between the primary node net and a pad. A third inductor may be located between the primary node net and the receiver.

One or more of the following features may be included. A first capacitor may be located between the transmitter and the first inductor. A second capacitor located between the second inductor and the pad. A third capacitor located between the third inductor and the receiver. A fourth capacitor located between the primary node net and a primary electrostatic discharge clamp. The transmitter and the receiver may be configured for three level pulse-amplitude modulation signaling. The primary node net may be operatively connected to the primary electrostatic discharge clamp.

In one or more embodiments of the present disclosure, a passive equalization circuit is provided. The circuit may include a transmitter, a receiver and a passive equalization circuit located between the transmitter and the receiver. A first plurality of inductors may be located between the transmitter and a primary node net and a second plurality of inductors may be located between the primary node net and a pad. A third plurality of inductors may be located between the primary node net and the receiver and a fourth plurality of inductors are located between the primary node net and a primary electrostatic discharge clamp.

One or more of the following features may be included. A first plurality of capacitors may be located between the transmitter and the primary node net. A second plurality of capacitors may be located between the primary node net and the pad. A third plurality of capacitors may be located between the primary node net and the receiver. A fourth plurality of capacitors may be located between the primary node net and a primary electrostatic discharge clamp. The transmitter and the receiver may be configured for three level pulse-amplitude modulation signaling.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

As used in any embodiment described herein, "circuit" or "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Figure 1:
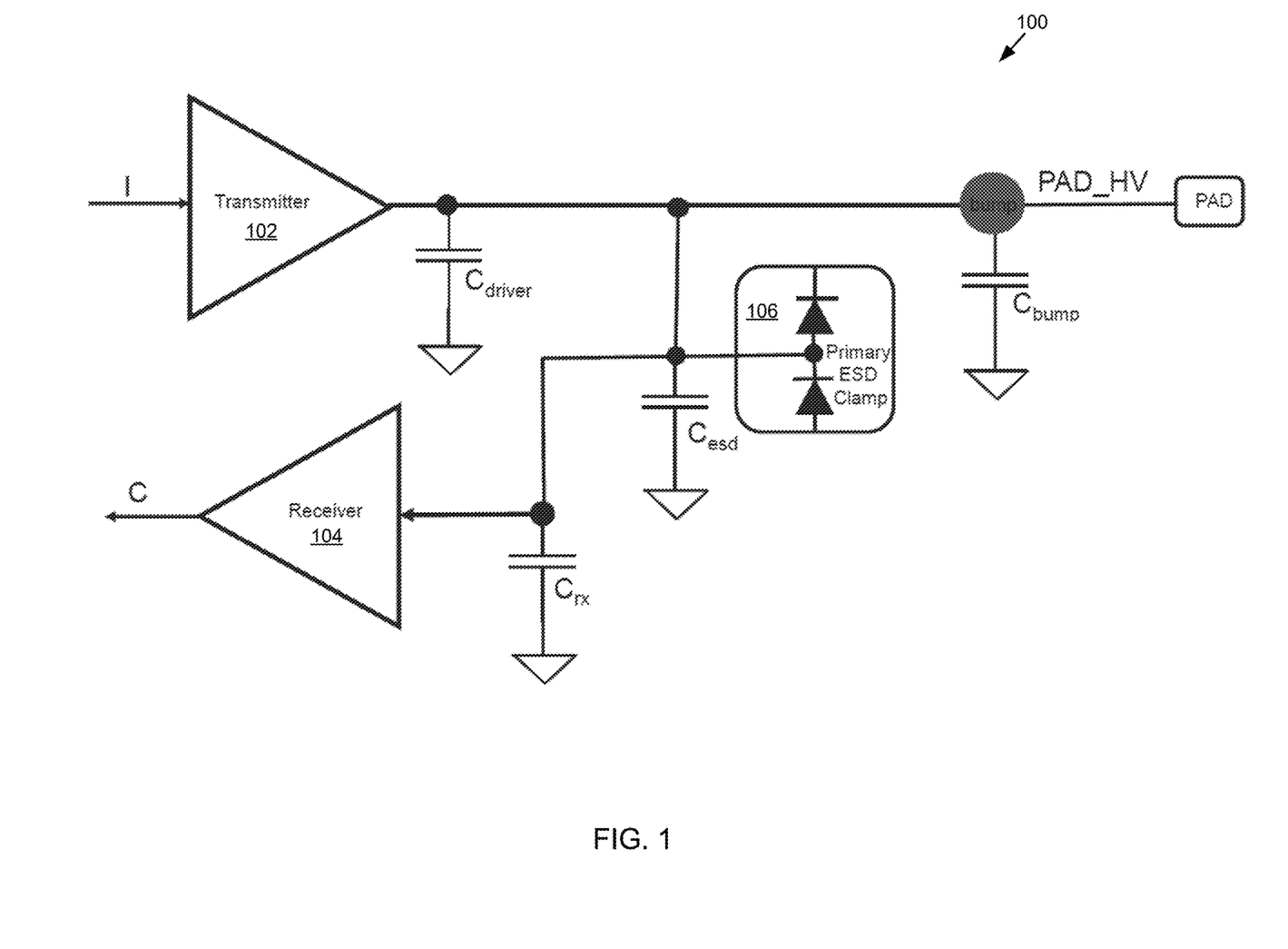
FIG. 1 shows a circuit for use with a high-speed memory interface.

Referring now to FIG. 1, an example circuit 100 showing the pad loading capacitance ($C_{pad}$) associated with a conventional high-speed memory interface. In this particular example, transmitter 102 and receiver 104 are shown with a primary electrostatic discharge (ESD) clamp 106 located therebetween. Here, the total capacitance seen by the output driver $C_{pad}=C_{driver}+C_{esd}+C_{rx}+C_{bump}$.

In the example of a GDDR7 memory interface the per pin target speed is 36 Gbps, which corresponds to a 48 Gbps effective data rate for a GDDR7 interface with 11 data pins per byte. To achieve a higher data-rate for a GDDR7 memory interface PAM3 signaling may be adopted for the GDDR7 memory interface which increases the UI per symbol to 41.67 ps for 36 Gbps PAM3 signaling. In a PAM3 signaling interface the lower reference voltage for a logic 11 to 00 transition is 0.625*VDDQ which corresponds to 25% of the signal swing. In a PAM3 signaling interface the upper reference voltage for a logic 00 to 11 transition is 0.875*$V_{DDQ}$ which corresponds to 75% of the signal swing. With 40Ω output driver impedance $R_{driver}$ and 1 pF load capacitance $C_{pad}$ the effective time constant at the output driver node equals 40Ω*1 pF=40 ps. With a 40 ps time constant the output eye at the driver output is fully closed at 36 Gbps PAM3 data rate as the UI is close to the time constant of the driver output. Embodiments of the present disclosure provide a new equalization scheme that may help to reduce the effective time constant of the signal path.

Figure 2:
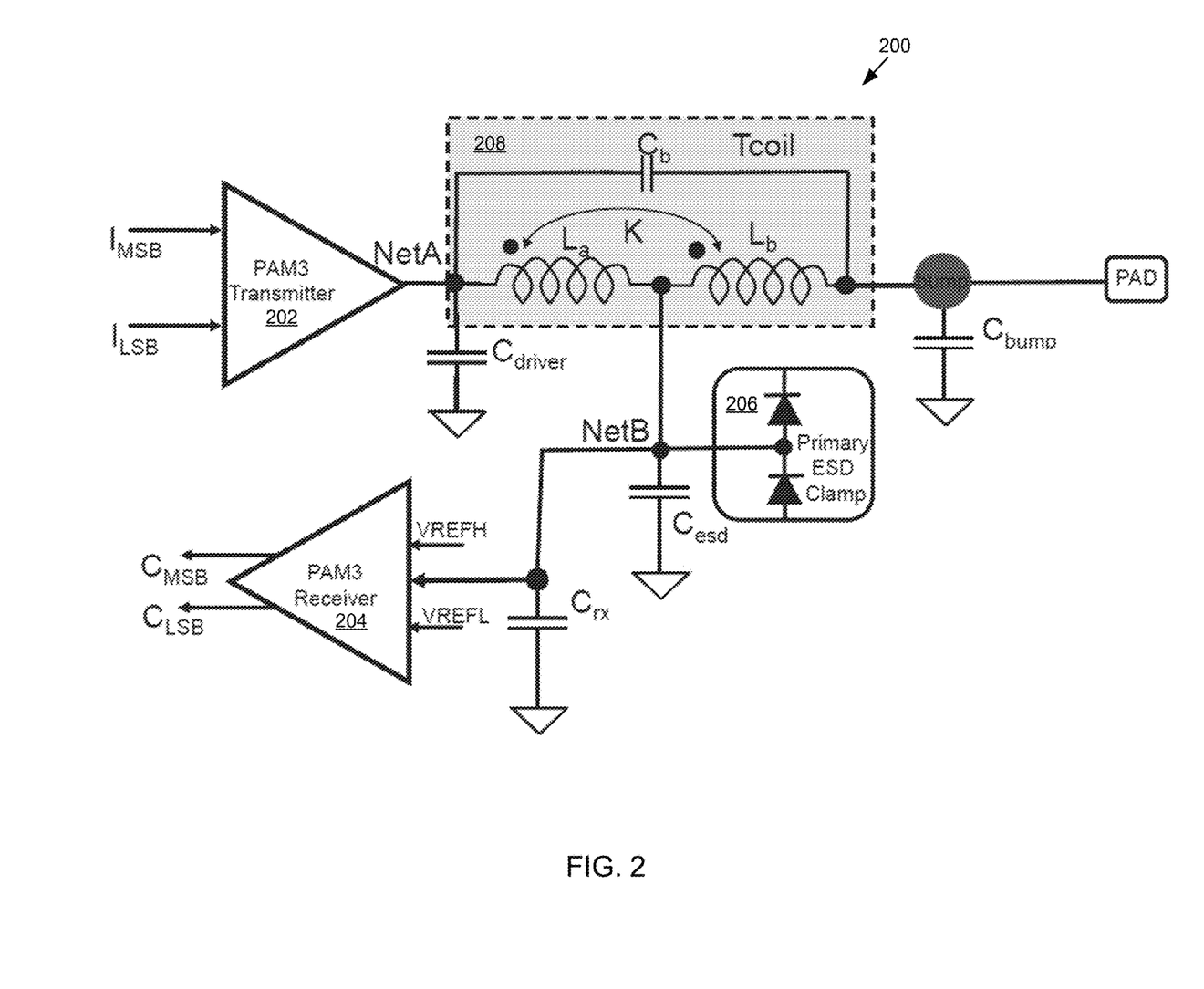
FIG. 2 shows a circuit having a T-coil based passive equalization methodology for use with a high-speed memory interface.

Referring now to FIG. 2, an example circuit 200 showing a T-coil based passive equalization approach associated with a conventional high-speed memory interface is provided. In this particular example, transmitter 202 and receiver 204 are shown with a primary electrostatic discharge (ESD) clamp 206 located therebetween. T-coil based passive equalization circuit 208 is operatively connected with transmitter 202. In this particular example, the capacitance seen by output driver get distributed and hence helps to achieve higher data rate. The $C_b$ capacitance of the Tcoil couples some fraction of $C_{bump}$ at the driver output node NetA and hence increases the time constant at node NetA, which limits the speed of the output driver. The effective capacitance seen at NetB is $C_{esd}+C_{rx}$, which increases the time constant at node NetB and hence limit the speed of the interface. The NetB time constant becomes the bottleneck for the interface speed and the use of the Tcoil is not able to address this particular issue.

Figure 3:
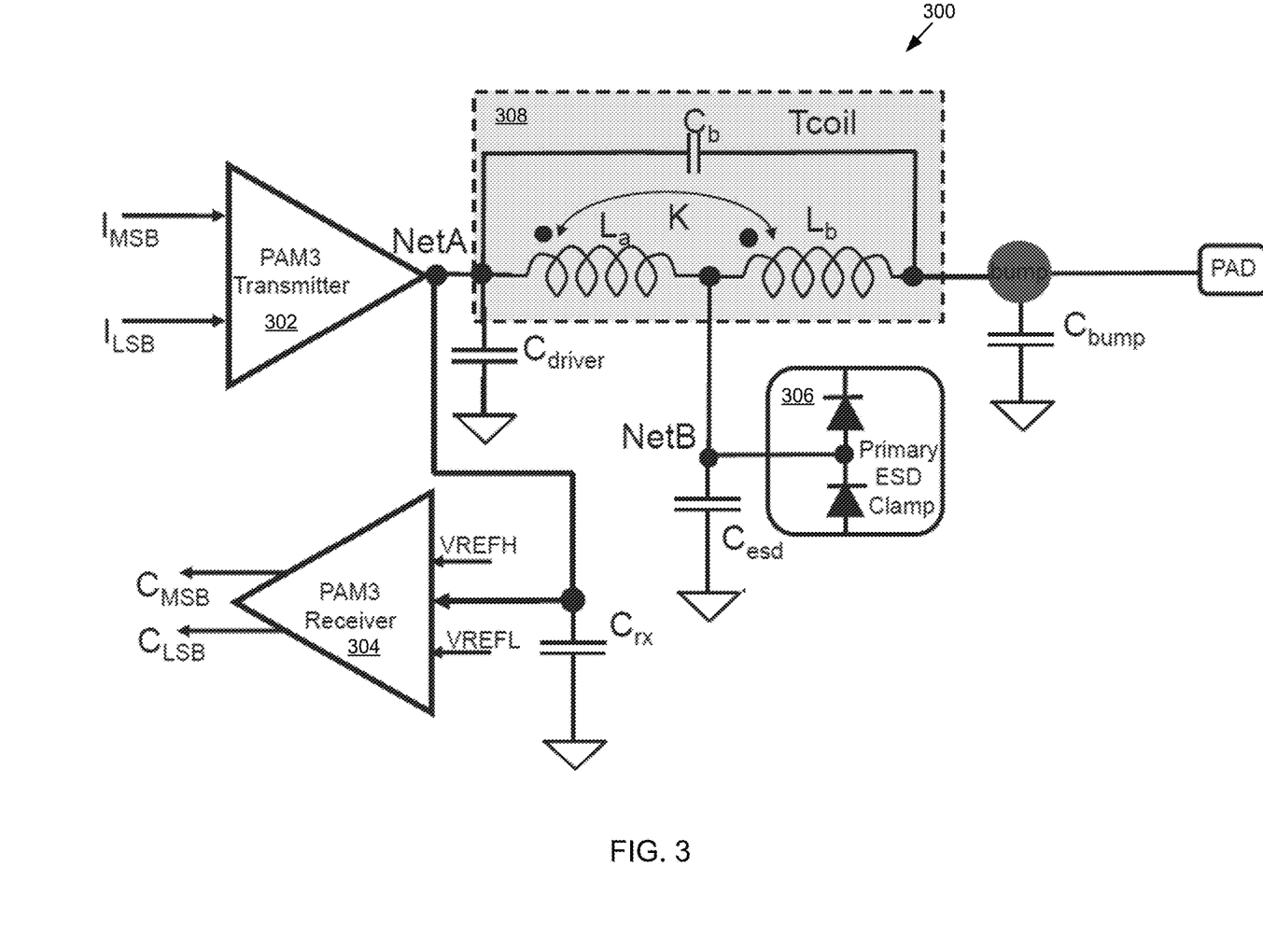
FIG. 3 shows a circuit having a T-coil based passive equalization methodology and a receiver connected at the output of the transmitter.

Referring now to FIG. 3, an example circuit 300 showing a T-coil based passive equalization approach associated with a conventional high-speed memory interface is provided. In this particular example, transmitter 302 and receiver 304 are shown with a primary electrostatic discharge (ESD) clamp 306 located therebetween. T-coil based passive equalization circuit 308 is operatively connected with transmitter 302. In this particular example, receiver 304 may be connected at the output of transmitter 302. Using this approach, the capacitive load at node NetB may be reduced due to which the node NetB time constant will reduce and hence the node NetB will not be the bandwidth limiter for the interface. However, the loading at receiver 304 will appear directly at the output of transmitter 302 and hence the effective load at transmitter 302 output node NetA will increase which will increase the time constant of node NetA and hence the node NetA become the bandwidth limiter for the high speed memory interface.

Figure 4:
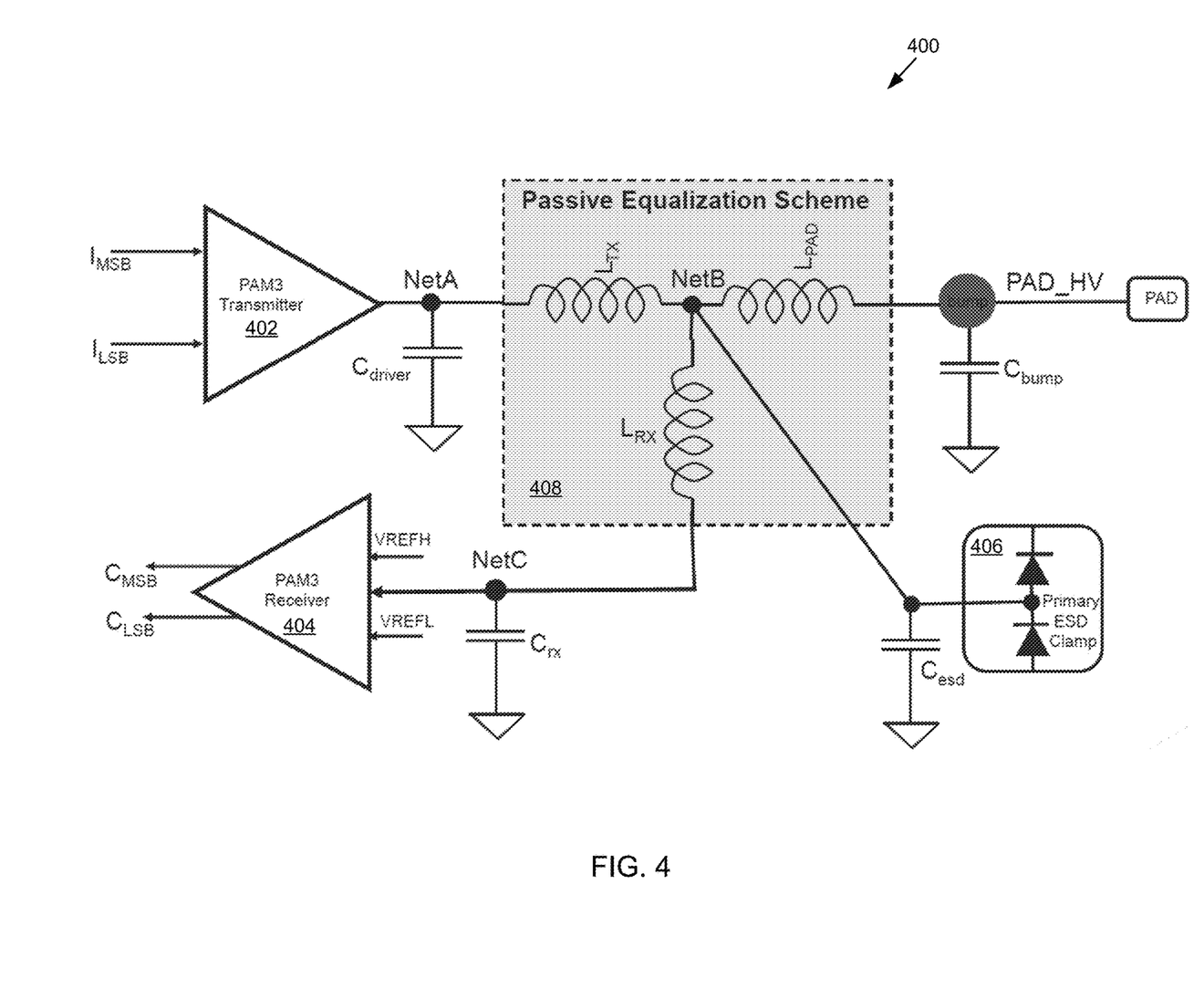
FIG. 4 shows a circuit having a passive equalization methodology consistent with embodiments of the present disclosure.
Figure 5:
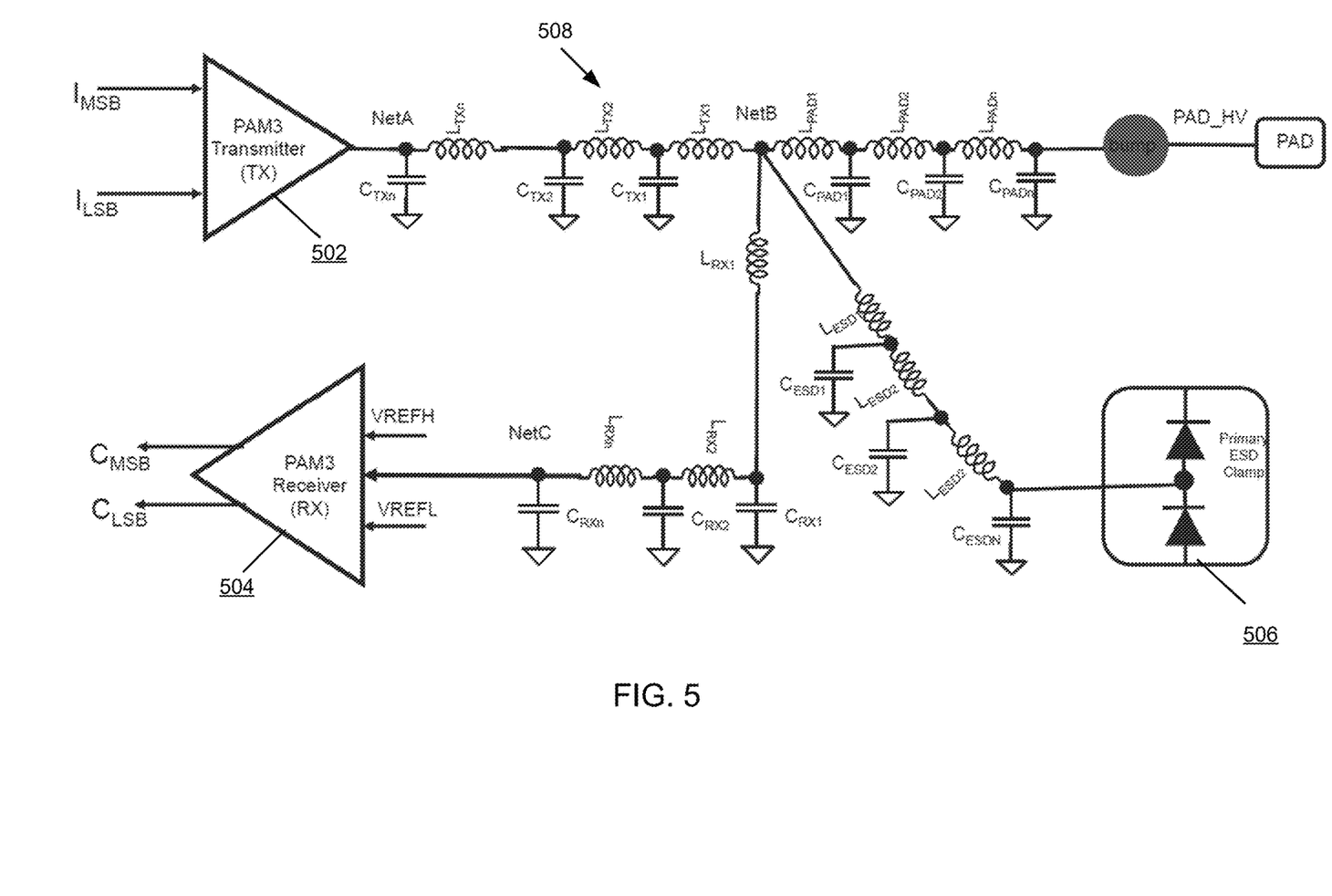
FIG. 5 shows a circuit having a passive equalization methodology consistent with embodiments of the present disclosure.
Figure 6:
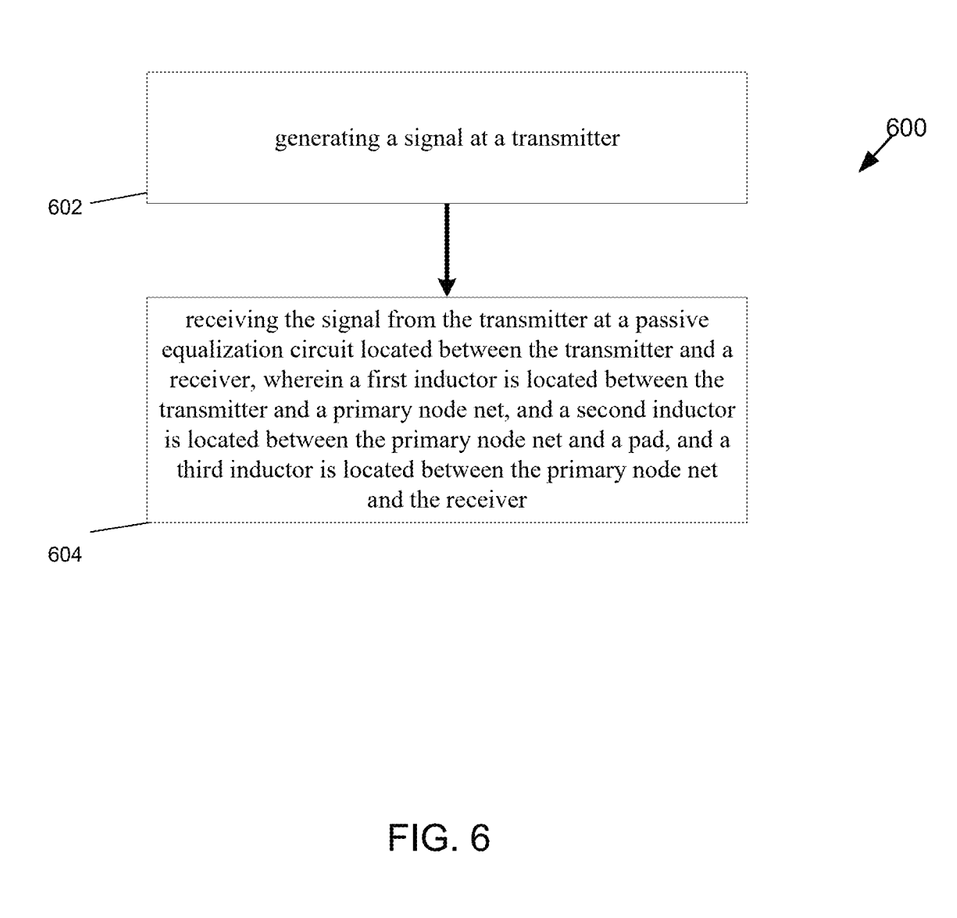
FIG. 6 shows a flowchart depicting one or more operations consistent with embodiments of the present disclosure.

Referring now to FIGS. 4-6, embodiments showing a passive equalization approach associated with a conventional high-speed memory interface is provided. In the example of FIG. 4, transmitter 402 and receiver 404 are shown with a primary electrostatic discharge (ESD) clamp 406 located therebetween. The disclosed passive equalization circuit 408 may be operatively connected with transmitter 402 and, receiver 404 and primary ESD clamp 406.

In some embodiments, an on-chip inductor $L_{TX}$ may be located between transmitter driver output node NetA and primary ESD clamp node NetB. The value of inductor $L_{TX}$ may be selected in such a way so that the other capacitive load connected on node PAD_HV is isolated during transition at node NetA. This configuration may reduce the effective capacitor seen by the output driver at node NetA to $C_{driver}$ and hence the effective time constant at node NetA may be reduced which will help to achieve a higher speed by the interface.

In some embodiments, an on-chip inductor LPAD may be located between primary ESD clamp node NetB and bump of the output node PAD_HV. The value of inductor LPAD may be selected in such a way so that the bump capacitive load $C_{bump}$ connected on PAD_HV is isolated during transition at node NetB. This configuration may reduce the effective capacitor seen by node NetB to $C_{esd}$ and hence the effective time constant at node NetB may be reduced which will help to achieve a higher speed by the interface.

In some embodiments, an on-chip inductor $L_{RX}$ may be located between primary ESD clamp node NetB and input of the receiver node NetC. The value of inductor $L_{RX}$ may be selected in such a way so that the Rx capacitive load $C_{rx}$ connected on node NetC is isolated during the transition at node NetB. This configuration may reduce the effective capacitor seen by node NetB to $C_{esd}$ and hence the effective time constant at node NetB will reduce which will help to achieve higher speed by the interface.

In operation, the passive equalization circuit of FIG. 4 may be configured to distribute the effective capacitive load seen by output driver (i.e., $C_{pad}=C_{driver}+C_{esd}+C_{rx}+C_{bump}$) into multiple segments. The distributed inductor network may isolate the capacitive load of other nodes from a given node and hence the effective time constant of the given node will reduce which will help to achieve higher speed by the interface. During the transmit mode the inductor $L_{TX}$ will isolate the capacitive load $C_{esd}$, $C_{rx}$ and $C_{bump}$ from node NetA and hence the effective time constant of node NetA will reduce which help to achieve higher data rate for transmit path. The inductor LPAD and inductor $L_{RX}$ will isolate the capacitive load $C_{rx}$ and $C_{bump}$ from node NetB and hence the effective time constant of node NetB will reduce which help to achieve higher data rate for transmit path. During the receive mode the inductor $L_{TX}$ and inductor $L_{RX}$ will isolate the driver capacitive load $C_{driver}$ and receiver capacitive load $C_{rx}$ from node NetB and hence the time constant of node NetB will reduce during receive mode which will help to achieve higher data rate for receive path. The inductors $L_{TX}$, LPAD and $L_{RX}$ values are tuned based on the capacitive load seen by the inductor to isolate it at highest required data rate. Once the inductor values are optimized for the highest data rate, the same values will work for lower data rate as well.

Referring now to FIG. 5, another embodiment showing a passive equalization approach associated with a conventional high-speed memory interface is provided. In the example of FIG. 5, circuit 500 may include transmitter 502 and receiver 504 are shown with a primary electrostatic discharge (ESD) clamp 506 located therebetween. Passive equalization circuit 508 is operatively connected with transmitter 502 and receiver 504. In this implementation, transmitter 502, receiver 504, primary electrostatic discharge (ESD) clamp 506 and bump routing may be segmented into multiple parts to reduce the effective capacitance on a given node. A first plurality of inductors may be located between transmitter 502 and a primary node NetB. A second plurality of inductors may be located between primary node NetB and the pad. A third plurality of inductors may be located between the primary node NetB and receiver 504. A fourth plurality of inductors may be located between the primary node NetB and primary electrostatic discharge clamp 506. A first plurality of capacitors may be located between transmitter 502 and the primary node NetB. A second plurality of capacitors may be located between the primary node NetB and the pad. A third plurality of capacitors may be located between the primary node NetB and receiver 504. A fourth plurality of capacitors may be located between the primary node NetB and primary electrostatic discharge clamp 506.

Embodiments of the present disclosure provide numerous advantages over existing approaches. The teachings of the present disclosure make it possible to design 36 Gbps GDDR7 Memory Interface with PAM3 signaling. The proposed Passive Equalization Scheme does not add any extra burden on the interface power and hence helps to design power efficient High-Speed memory interface. This helps in increasing the timing budget of transmit and receive path. The increased eye margins also help in better convergence of $V_{REF}$ and DFE algorithms. The proposed scheme is immune to mismatch and VT drift (voltage and temperature drift). The proposed passive equalization scheme will be very useful for future high-speed memory interfaces where the PAD loading become the speed limiter for the interface.

Referring now to FIG. 6, a flowchart depicting operations consistent with the present disclosure is provided. The method may include generating (602) a signal at a transmitter and receiving (604) the signal from the transmitter at a passive equalization circuit located between the transmitter and a receiver. The passive equalization circuit may include a first inductor located between the transmitter and a primary node net, and a second inductor located between the primary node net and a pad. A third inductor may be located between the primary node net and the receiver.

Numerous other operations are also within the scope of the present disclosure. It will be apparent to those skilled in the art that various modifications and variations can be made in embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A circuit comprising:
   a transmitter;
   a receiver; and
   a passive equalization circuit located between the transmitter and the receiver, wherein a first inductor is located between the transmitter and a primary node net, and a second inductor is located between the primary node net and a pad, and a third inductor is located between the primary node net and the receiver, wherein a plurality of capacitors are located between the primary node net and a primary electrostatic discharge clamp.

2. The circuit of claim 1, further comprising a first capacitor located between the transmitter and the first inductor.

3. The circuit of claim 1, further comprising a second capacitor located between the second inductor and the pad.

4. The circuit of claim 1, further comprising a third capacitor located between the third inductor and the receiver.

5. The circuit of claim 1, wherein the transmitter and the receiver are configured for three level pulse-amplitude modulation signaling.

6. The circuit of claim 1, wherein the primary node net is operatively connected to the primary electrostatic discharge clamp.

7. A method comprising:
   generating a signal at a transmitter; and
   receiving the signal from the transmitter at a passive equalization circuit located between the transmitter and a receiver, wherein a first inductor is located between the transmitter and a primary node net, and a second inductor is located between the primary node net and a pad, and a third inductor is located between the primary node net and the receiver, wherein a plurality of capacitors are located between the primary node net and a primary electrostatic discharge clamp.

8. The method of claim 7, further comprising a first capacitor located between the transmitter and the first inductor.

9. The method of claim 7, further comprising a second capacitor located between the second inductor and the pad.

10. The method of claim 7, further comprising a third capacitor located between the third inductor and the receiver.

11. The method of claim 7, wherein the transmitter and the receiver are configured for three level pulse-amplitude modulation signaling.

12. The method of claim 7, wherein the primary node net is operatively connected to the primary electrostatic discharge clamp.

13. A circuit comprising:
   a transmitter;
   a receiver; and
   a passive equalization circuit located between the transmitter and the receiver, wherein a first plurality of inductors are located between the transmitter and a primary node net, a second plurality of inductors are located between the primary node net and a pad, a third plurality of inductors are located between the primary node net and the receiver, and a fourth plurality of inductors are located between the primary node net and a primary electrostatic discharge clamp.

14. The circuit of claim 13, further comprising a first plurality of capacitors located between the transmitter and the primary node net.

15. The circuit of claim 13, further comprising a second plurality of capacitors located between the primary node net and the pad.

16. The circuit of claim 13, further comprising a third plurality of capacitors located between the primary node net and the receiver.

17. The circuit of claim 13, further comprising a fourth plurality of capacitors located between the primary node net and a primary electrostatic discharge clamp.

18. The circuit of claim 13, wherein the transmitter and the receiver are configured for three level pulse-amplitude modulation signaling.

* * * * *